Feb. 2 1971  D. J. GARDNER  3,559,406
VEHICLE BRAKING SYSTEM
Filed May 2, 1969  3 Sheets-Sheet 2
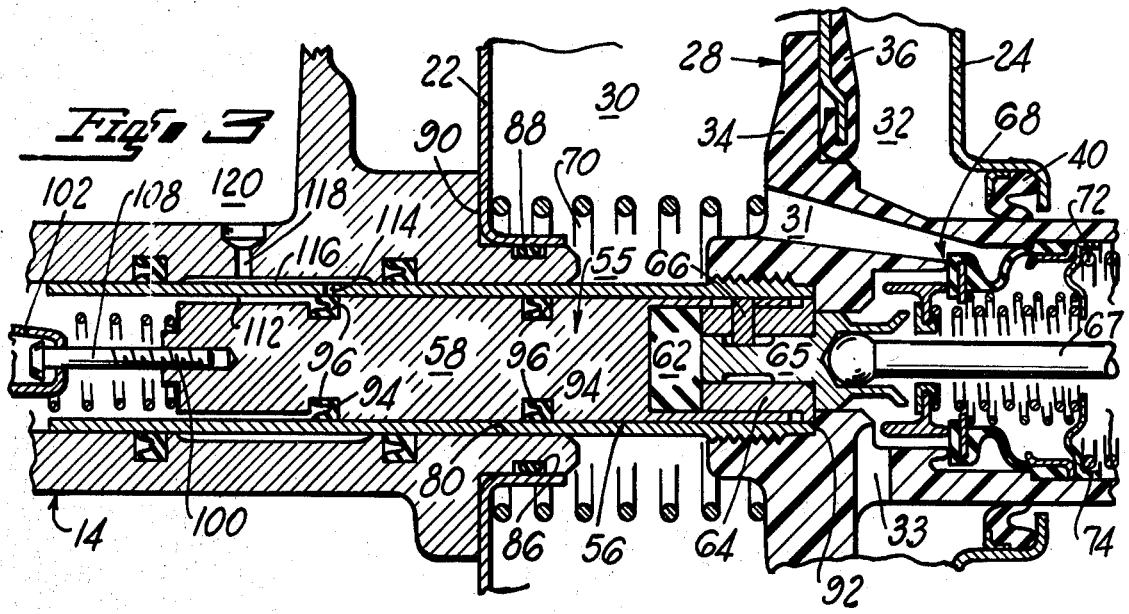
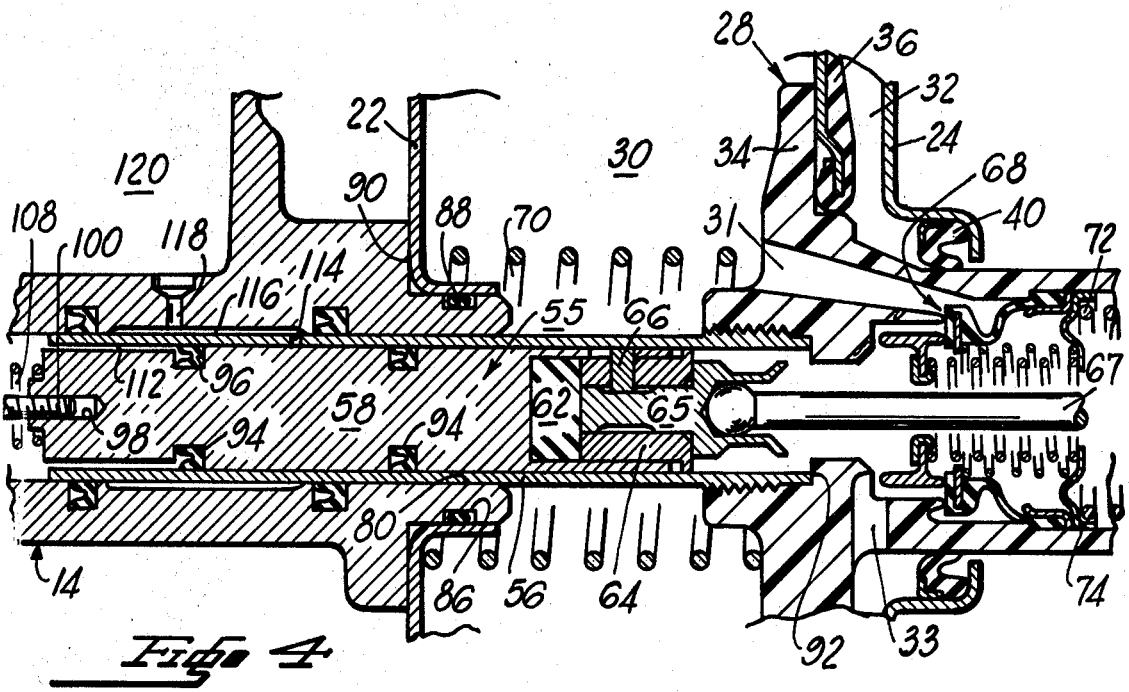
INVENTOR.
DELBERT J. GARDNER
BY
Plante, Arens, Hartz, Hix and Smith
ATTORNEYS

United States Patent Office 3,559,406
Patented Feb. 2, 1971

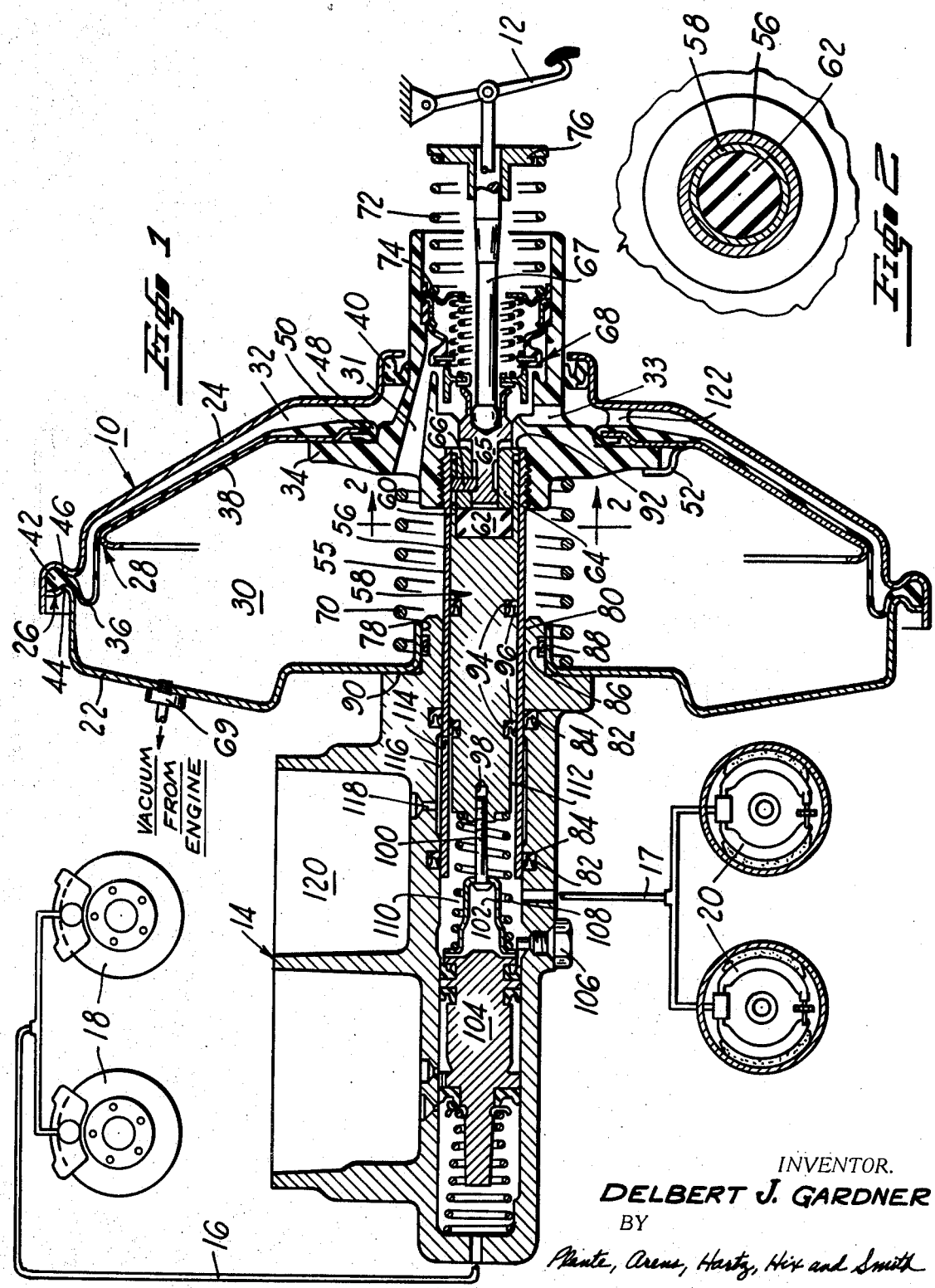

3,559,406
VEHICLE BRAKING SYSTEM
Delbert J. Gardner, South Bend, Ind., assignor to The Bendix Corporation, a corporation of Delaware
Filed May 2, 1969, Ser. No. 821,175
Int. Cl. F15b 7/00, 7/08
U.S. Cl. 60—54.5
6 Claims

ABSTRACT OF THE DISCLOSURE

A pressure ratio changing device for a servomotor of a power braking system. A first piston secured to the hub member of the movable wall of the servomotor extends into the hydraulic chamber of a master cylinder. A second piston located in a bore within the first piston also extends into the hydraulic chamber. Depression of an actuator by an operator will open a valve in the hub member to create a pressure differential across the movable wall. As the wall moves, the first piston will energize the master cylinder to pressurize the hydraulic fluid in the braking system. Further depression of the actuator by the operator will move the second piston to add to the energizing force of the first piston. A reaction member adjacent the second piston will selectively position the movable wall and the actuator in proportion to an internal reactive back force to maintain equilibrium within the system during activation.

BACKGROUND OF THE INVENTION

This invention relates to a power braking system for a motor vehicle. More particularly, it relates to a system that is capable of the required power operation while needing only a relatively short foot pedal travel and low pedal effort. The invention further contemplates a combination power and manual system which minimizes the transition from the power to no-power conditions.

Booster brake system known in the art have several disadvantages. One is that they usually provide a noticeable change in the foot effort required for operation when power runout (vacuum or air) occurs. Power runout is defined here as the point where the vacuum servo has provided its maximum effect. Additional pressure above this point is provided solely by the manual system. It has been found that considerable foot effort is required to appreciably increase the hydraulic brake line pressure after vacuum runout. Moreover, it has been found that very high braking pressures, which may be required during emergency braking conditions, cannot always be attained with the standard booster system because the extremely high foot effort required is beoynd the physical capability of many drivers.

Although this invention is shown in a braking system embodiment, and thus, may well be most valuable in the braking art, it is felt that the invention may be used for any application where a change of pressure ratio of a fluid is required.

Furthermore, this invention represents a still different power braking system from that shown in U.S. application Ser. No. 809,860 having the same assignee.

SUMMARY OF THE INVENTION

It is an object of this invention to provide an improved power braking system including manual operation.

It is an object of this invention to provide a vehicle braking system employing improved manual operation in the event of power runout or power failure.

It is an object of this invention to provide an improved power braking system including a pressure ratio changer which becomes operative during manual operation to minimize pedal effort.

It is an object of this invention to provide a pressure ratio changer that is selectively responsive to sources of force to change the pressure of the fluid being pressurized.

It is an object of this invention to provide a pressure ratio changer than includes reaction means to give the operator of the vehicle a better feel of the brakes during application.

It is an object of this invention to provide a vehicle braking system employing power assist and having the additional safety feature of manual operation in the event of power failure.

Other objects and features of the invention will be apparent from the following description of the vehicle braking system taken in connection with the accompanying drawings.

BRIEF DESCRIPTION OF THE DRAWINGS

FIG. 1 schematically illustrates a vehicle braking system embodying the concept of this invention;

FIG. 2 is a sectional view taken along line 2—2 of FIG. 1;

FIG. 3 is an enlarged sectional view of the pressure ratio changer means of this invention, showing one mode of operation;

FIG. 4 is an enlarged sectional view of the pressure ratio changer means of this invention, showing another mode of operation;

DESCRIPTION OF THE PREFERRED EMBODIMENT

Figure 5:
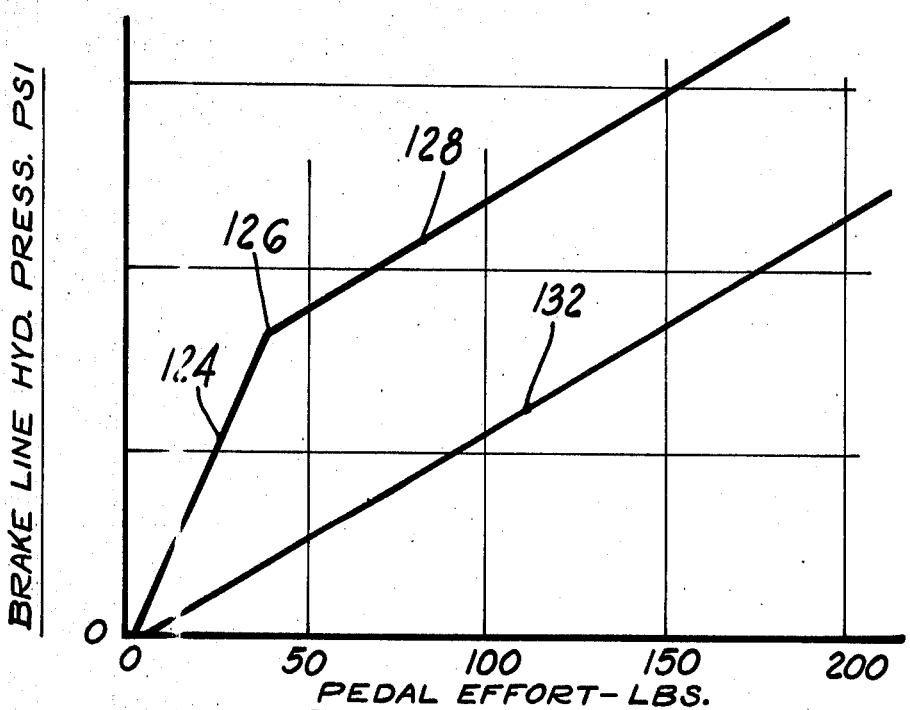
FIG. 5 is a graph showing brake line hydraulic pressure as a function of pedal effort by the vehicle operator.

With reference to FIG. 1, there is shown in schematic form a vehicle braking system comprising a fluid pressure servomotor 10 which is responsive to an operator-operated means or brake pedal 12 to actuate a master cylinder 14 for pressurizing hydraulic fluid in conduits 16 and 17 so as to apply the front and rear brakes 18 and 20, respectively, of the vehicle.

More specifically, the fluid pressure servomotor 10 includes a forward shell 22 and a rearward sheel 24 joined at 26 by a bayonet type twist lock arrangement. A movable wall means 28 is operatively arranged within the shells of the servomotor 10 so as to define variable volume chambers 30 and 32. The movable wall means 28 includes a hub 34, a diaphragm means 36 and a diaphragm support means 38. The hub 34 is slidingly and sealingly carried by seal portion 40 of the rearward shell 24. The diaphragm means 36 has an outer bead 42 which is compressed between annular flanges 44 and 46 of the shells 22 and 24, respectively, to form a pressure seal therebetween. The diaphragm means 36 has an inner bead 48 which is installed around a center hole portion 50 of the diaphragm support plate 38. The diaphragm support plate 38 has fingers 52 which grip and fasten the support plate 38 to the hub 34 so as to create a seal between the diaphragm 36 and hub 34.

As may be seen in FIGS. 1, 2 and 3, the hub 34 is further adapted to carry a pressure ratio changer means 55 comprising concentric pistons 56 and 58. The innermost piston 58 has on one end a bore 60 which suitably receives therein a reaction means 62. The reaction means is retained in the bore 60 by a sleeve 64 which is slidingly fitted into the bore 60. The sleeve 64 slidingly carries a plunger means 65. The sleeve also has a key 66 to captively retain the plunger means 65 within the sleeve 64. The operator-operated means 12 includes a push rod 67 which engages the plunger means 65 to control a valve means, generally referred to as numeral 68, to establish a pressure differential across said movable wall means 28. More specifically, chamber 30 is in communication through a check valve 69 with the engine manifold vacuum, not shown. The movable wall means 28 is vacuum suspended in the brake released position as shown in FIG. 1, since the valve means 68 allows communication of chamber 32 with chamber 30 via passages 31 and 33. The valve means 68 is responsive to actuation of said operator-operated means 12 to admit atmospheric air pressure into chamber 32 via passage 33 so as to move the movable wall means 28 to the left as viewed in FIG. 1. Return spring 70 is interposed between shell 22 and the hub 34 to return the movable wall means 28 to its inoperable position upon release of the braking application. Likewise, a return spring 72 is interposed between flange 74 of valve means 68 and flange 76 of the push rod 67 to return said push rod to its inoperable position.

As may be seen best in FIG. 1, the master cylinder 14 is suitably installed in central opening 78 of the forward shell 22. The master cylinder 14 is a bore 80 which is slidably installed over the outer periphery of the piston 56 of the pressure ratio changer means. The bore 80 has annular grooves 82 equipped with seals 84 to provide a fluid seal between the bore 80 and the outer piston 56. Similarly, the outer periphery of the master cylinder 14 has a groove 86 equipped with a seal 88 to provide a seal between the master cylinder 14 and forward shell 22. A flange 90 is provided on the master cylinder 14 to abut the shell 22 and thereby establish a predetermined axial relationship between the master cylinder 14 and the pressure ratio changer means 55.

Referring now specifically to the pressure ratio changer means 55, the outermost piston 56 slidably carries piston 58. It is noted here that an annular flange 92 is formed integral with the hub 34 and serves as an abutment surface for the end of the outermost piston 56 and the end of sleeve 64. Piston 58 includes annular grooves 94 having seals 96 installed therein to establish a fluid seal between pistons 56 and 58. The inner piston 58 has on its other end a threaded bore 98 for receiving a bolt 100. The bolt 100 is slidably received by spring retainer 102 and the head of the bolt 100 is held captive by the retainer 102. The retainer 102 is axially positioned within bore 80 in one direction of movement by the end of piston 104 and in the other direction by plug 106. A return spring 108 is installed between the retainer 102 and piston 58 to return piston 58 to its inoperable position when the vehicle brakes are not applied. The left end of the pressure ratio changer means 55, the bore 80 of the master cylinder 14 and the end of piston 104 define a hydraulic fluid chamber 110. The chamber 110 is in communication through annular passageway 112, passage 114, annular groove 116 and conduit 118 with reservoir 120 of the master cylinder 14. It is noted that the bolt 100 may be threadably adjusted to set the position of the leftwardmost seal 96 with respect to the conduit 114 which serves as the compensating port for hydraulic fluid chamber 110.

As will be understood by those skilled in the art, numerous other forms of controlling fluid communication between chamber 110 and reservoir 120 may be adapted for use with the pressure ratio changer means 55 herein disclosed and are therefore intended to be included within the scope of this invention.

MODE OF OPERATION OF THE PREFERRED EMBODIMENT

Referring briefly to FIG. 1, it is noted that when the brake pedal 12 is in the released position, the movable wall means 28 is abutting the rearward shell 24 as at abutment 122 and the leftwardmost seal 96 to the piston 58 is positioned immediately to the right of the passage or compensating port 114. Upon initial depression of brake pedal 12, the piston 58 moves to the left carrying with it the seal 96 thereby closing the conduit or compensating port 114 which, in turn, traps hydraulic fluid within hydraulic fluid chamber 110, as seen in FIG. 3.

Referring now to FIG. 3, simultaneously with this movement of piston 58 during a brake application, the driver of the vehicle depresses brake pedal 12 to move push rod 67 inwardly; whereby the valve means 68 will cut off the chamber 32 from the vacuum existing in chamber 30 to allow atmospheric air to flow through the hub 34 and passage 33 into control chamber 32. At this time, a pressure differential is created across the diaphragm 36 by means of atmospheric air being in chamber 32 and a vacuum being in chamber 30. The pressure differential will cause the movable wall means 28 to move to the left, as shown in FIG. 3. As the movable wall means 28 moves to the left, the hub 34 exerts a force on the outermost piston 56 to slide it toward the left within bore 80 of the master cylinder 14. The previously described depression of the brake pedal 12 causes push rod 67 to move the plunger means 65 to the left to exert a force against the reaction means 62 to move the inner piston 58 to the left so that the pressure ratio changer means 55 as a whole moves to the left. The concentric pistons 56 and 58 (essentially acting as a single piston) pressurizes the trapped hydraulic fluid in chamber 110 which, in turn, transmits a fluid force directly to the rear brakes 20 and to the piston 104 so as to pressurize fluid to the vehicle front brakes 18. Also the hydraulic fluid in chamber 110 transmits a reactive force back to the operator through piston 58 and transmits force to the movable wall 28 through pistons 56 and 58; these reactive forces being proportioned through the pistons so as to bring the system into equilibrium. Moreover, the reaction means 62 transmits a reactive force back to the operator of the vehicle to give a better feel of the braking application. The curves of FIG. 5 depict typical pedal effort characteristics of the fluid pressure servomotor 10. Specifically, brake line hydraulic pressure in p.s.i., is plotted along the ordinate as a function of brake pedal effort in lbs., plotted along the abscissa. The power assist operation of the structure described immediately above and shown in FIG. 3, is represented by curve 124, shown in FIG. 5.

At the point of vacuum runout, identified in FIG. 5 at 126, no additional force is developed by the movable wall means 28. Additional pedal effort may be applied by the vehicle operator through pedal 12, push rod 67, plunger means 65 and the reaction means 62 to move piston 58 further to the left. As piston 58 moves to the left in response to increased pedal effort, likewise piston 56 will move to the left so that the reactive force of chamber 110 and the reaction means 62 will be shared by the movable wall 28 and the pedal 12. The system is brought into equilibrium by the reactive force being proportioned between the movable wall 28 and the pedal 12. The Increase in hydraulic fluid pressure possible through further leftward movement of the pressure ratio changer means 55 is represented by curve 128, as shown in FIG. 5.

Figure 6:
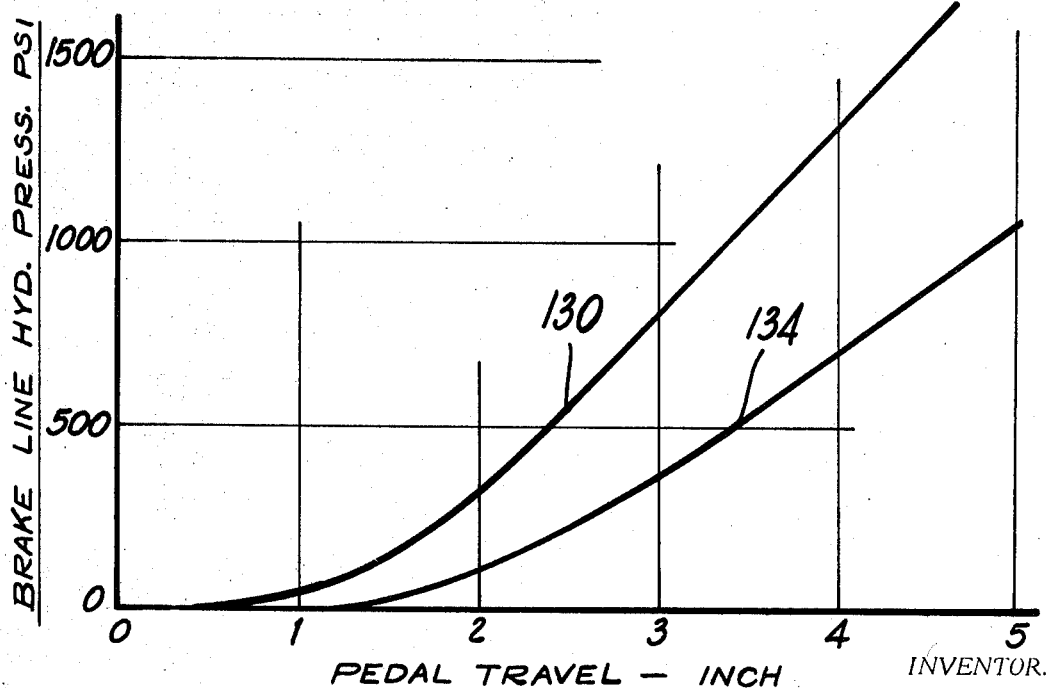
FIG. 6 is a graph showing brake line hydraulic pressure as a function of pedal travel by the vehicle operator.

The curves of FIG. 6 depict typical pedal travel characteristics of the fluid pressure servomotor 10. Specifically, brake line hydraulic pressure in p.s.i., is plotted along the ordinate as a function of pedal travel in inches, plotted along the abscissa. Curve 130 of FIG. 6 represents the pedal travel associated with vacuum power assist and further operation beyond vacuum runout.

It is noted that upon release of the braking application, return springs 70 and 72 return the movable wall 28 and brake pedal 12, respectively, to their brake released positions. A return spring 108, interposed between retainer 102 and the end of piston 58 and return spring 72 will return the piston 58 to its brake released position.

Referring now specifically to FIG. 4, therein is shown the operation of the fluid pressure servomotor 10 and more importantly the manual operation of the pressure ratio changer means 55 in the event of a power assist failure. It is assumed that for one of several possible reasons that a pressure differential is not developed across the movable wall means 28 in response to a brake pedal 12 application. In the absence of the pressure differential, the hub 34 and outermost piston 56 remain stationary; i.e., do not move from their brake released positions shown in FIG. 1. However, the push rod 67 applied a force on the innermost piston 58, via the plunger means 65 and reaction means 62, to move piston 58 toward the left to apply the brakes as previously described. As will be seen now by a comparison of FIGS. 3 and 4, a hydraulic pressure ratio change is made by having only one of the two concentric pistons move toward the left so as to pressurize the fluid in chamber 110. By utilizing only piston 58 (instead of both pistons 56 and 58) the effective area acting to pressurize the fluid in chamber 110 is smaller and therefore the pressure of the fluid higher in the event of power failure. Thus, the pressure ratio change minimizes the conventional increase in pedal effort experienced in response to a power failure. Curve 132 of FIG. 5 shows the pedal effort required in the absence of vacuum power assist. Curve 134 of FIG. 6 depicts the pedal travel required in the absence of vacuum power assist.

While the specific details have been herein shown and described, the invention is not confined thereto as other substitutions can be made within the spirit and scope of the invention.

I claim:

1. In a vehicle braking system, a fluid pressure servomotor comprising:
   a housing;
   movable wall means operatively arranged in said housing defining variable volume chambers, said movable wall means including a hub;
   valve means carried in said hub;
   operator-operated means for actuating said valve means, said valve means operable to control a pressure differential across said movable wall means to cause said movable wall means to move in response to actuation of said operator-operated means;
   a hydraulic fluid chamber in communication with the brakes of said vehicle;
   pressure ratio changer means having first and second concentric piston means operatively connected to said hydraulic fluid chamber, said first piston means being operatively connected to said movable wall means, said second piston means being slidably carried by said first piston means and operatively connected to said operator-operated means; and
   reaction means located on one end of a bore in said second piston means to selectively respond to said movable wall means and said operator-operated means to pressurize said hydraulic fluid chamber.

2. In a power braking system having a servomotor which energizes a master cylinder, means to increase the hydraulic fluid pressure supplied by said master cylinder to operate said braking system, said means comprising:
   movable wall means dividing said servomotor into a first and a second variable volume chamber, said first variable chamber being connected to a source of vacuum;
   a hub member slidably retained in said servomotor and secured to said movable wall means;
   valve means located in said hub member for permitting vacuum in said first variable volume chamber access to said second variable volume chamber for suspending said movable wall means in vacuum in its rest position;
   first piston means attached to said movable wall, extending through said first variable volume chamber and into a hydraulic chamber of said master cylinder;
   second piston means located within said first piston means being operatively connected to said valve means and said hydraulic chamber; and
   actuating means acting in response to an operator for moving said valve means to thereby close off the vacuum access to said second variable volume chamber and permit atmospheric pressure to said second variable volume chamber creating a pressure differential across said movable wall means when vacuum is available, said pressure differential causing said movable wall means to directly move said first piston means and said second piston means together to energize said master cylinder.

3. In the power braking system as recited in claim 2, wherein said actuating means acting in further response to an operator moves said second piston means in said first piston means to increase the pressure force acting on said hydraulic fluid.

4. In the power braking system as recited in claim 3, including:
   a reaction means retained in said second piston means by a sleeve member, said reaction means transmitting a reactive force back through said actuating means to give the operator a feel of the braking application.

5. In the power braking system as recited in claim 4, wherein the pressure differential across said movable wall means is not large enough to move said movable wall means and said actuating means initially moves said second piston means to energize said master cylinder.

6. In a fluid pressure braking system having a vacuum suspended movable wall which divides a servomotor housing into a vacuum chamber and a control chamber, means to change the energizing pressure received by a master cylinder in response to an internal reactive force, said means comprising:
   a hub member attached to said movable wall and slidably retained in a rear shell of said servomotor housing, said hub member having an axial bore;
   valve means retained in said axial bore of said hub member, said valve means regulating said vacuum suspended movable wall;
   actuating means responsive to an operator for controlling said valve means;
   first piston means secured to said movable wall and slidably retained in a hydraulic chamber for energizing said master cylinder supplying fluid pressure to operate said braking system in response to said actuating means;
   second piston means located in an internal bore of said first piston means connected to said hydraulic chamber, said second piston means initially moving with said first piston means, said second piston means moving in said internal bore in further response to said actuating means to add to the energization of said master cylinder by said first piston means; and
   reaction means responsive to said internal reactive force for positioning said movable wall and said actuating means to bring said braking system into equilibrium upon actuation by an operator.

References Cited

UNITED STATES PATENTS

| | | | |
|---|---|---|---|
| 2,499,775 | 3/1950 | Pigaleau | 60—54.5P |
| 2,532,960 | 12/1950 | Stelzer | 60—54.5P |
| 3,109,287 | 11/1963 | Gardner | 60—54.6P |
| 3,422,622 | 1/1969 | Arentoft et al. | 60—54.6PX |
| 3,473,329 | 10/1969 | Eggstein | 60—54.6P |

MARTIN P. SCHWADRON, Primary Examiner

R. BUNEVICH, Assistant Examiner

U.S. Cl. X.R.

60—54.6